United States Patent [19]

Genheimer et al.

[11] 4,286,303
[45] Aug. 25, 1981

[54] PROTECTION SYSTEM FOR AN ELECTRIC MOTOR

[75] Inventors: Stephen R. Genheimer, Bethany, Okla.; John A. Whitney, Fort Wayne; Linda M. Reinhard, Bluffton, both of Ind.

[73] Assignee: Franklin Electric Co., Inc., Bluffton, Ind.

[21] Appl. No.: 21,613

[22] Filed: Mar. 19, 1979

[51] Int. Cl.³ .......................................... H02H 7/085
[52] U.S. Cl. ...................................... 361/24; 361/31; 361/103; 318/798
[58] Field of Search ....................... 361/24, 25, 26, 28, 361/31, 22, 23, 93, 94, 95, 96, 97, 35, 37, 103, 105; 318/798, 806; 340/310 R, 310 A; 364/483

[56] References Cited

U.S. PATENT DOCUMENTS

| | | | |
|---|---|---|---|
| 3,283,236 | 11/1966 | Legg | 361/31 X |
| 3,742,303 | 6/1973 | Dageford | 361/31 X |
| 3,815,006 | 6/1974 | Woods et al. | 318/474 |
| 3,831,061 | 8/1974 | Boyd | 361/94 |
| 3,875,487 | 4/1975 | White | 361/23 X |
| 3,919,600 | 11/1975 | Sons | 361/31 |
| 4,006,387 | 2/1977 | Hudak | 361/94 X |
| 4,021,700 | 5/1977 | Ellis-Anwyl | 361/24 X |
| 4,044,288 | 8/1977 | Godfrey | 361/25 X |
| 4,054,932 | 10/1977 | Sehmer et al. | 361/31 |

*Primary Examiner*—Patrick R. Salce
*Attorney, Agent, or Firm*—Merriam, Marshall & Bicknell

[57] ABSTRACT

This disclosure relates to apparatus and method for controlling and protecting an electric motor. A transmitter is coupled to the motor and to the power lines for generating pulses on the power lines in certain circumstances such as during an overheated motor condition. A control unit is coupled to the power lines and senses the pulses and monitors the power current magnitude in the lines. The unit compares the current level with previously established upper and lower limits. If the current level is outside the limits for a preset length of time, a fault condition exists and the motor is turned off for a length of time that depends upon the severity of the fault. The unit also turns off the motor upon the receipt of pulses from the transmitter when a certain number of pulses regularly recur. The unit includes indicators for displaying the nature of the fault. The unit may be adjusted for automatic operation wherein it will turn the motor on again after a time interval, or for manual operation wherein the motor can only be restarted manually.

15 Claims, 4 Drawing Figures

FIG_3B

PROTECTION SYSTEM FOR AN ELECTRIC MOTOR

DISCLOSURE OF THE INVENTION

The prior art includes many types of electric motor protection systems. Some of these systems are designed to sense the current in the power lines leading to the motor and to disconnect the power to the motor in the event the current increases to above a certain limit. Another type of protection system is disclosed in U.S. Pat. No. 3,594,584 and U.S. Pat. No. 3,815,006, wherein a pulse transmitter in the motor generates pulses on the power lines in the event the motor windings become overheated. A detector coupled to the power lines responds to the pulses and disconnects the power to the motor.

While the foregoing systems provide a degree of protection, they are limited in that they respond to only a few types of faults. Further, they cannot determine the severity of certain faults and indicate that a certain type of fault existed at an earlier time.

Accordingly, it is a general object of the present invention to provide a new and improved system which does not have the foregoing disadvantages.

Apparatus in accordance with this invention is for use with an electric motor that receives electric power over at least two power lines. The apparatus includes sensor means coupled to one or more of the power lines and providing an indication of the current level in the lines. Processing means receives the current indication and determines whether the current level is within preestablished limits. If the current level is outside the limits, fault timer means determine whether the fault condition exists for a certain time interval; if it does, the motor is turned off by off-delay means and a trip indicator shows the off condition. The off-delay means turns the motor on again after an off-time interval, and means is provided to vary the length of the off-time interval in response to the severity and frequency of the fault. Means is further provided to determine whether the motor is running, by sensing the current level.

The motor preferably further includes transmitter means for generating pulses on the lines in the event of an overheated motor condition. The apparatus includes pulse sensor, means for detecting when the pulses continuously persist, and means for turning off the motor for an off-time interval.

The invention further comprises the method of controlling and protecting a motor.

Other objects, advantages and features of the invention will be apparent from the following detailed description taken in conjunction with the accompanying figures of the drawings, wherein.

While the specific example of the invention illustrated and described herein relates to a three-phase AC motor, it should be understood that the invention may also be useful with various types of devices such as a single phase AC motor.

Figure 1:
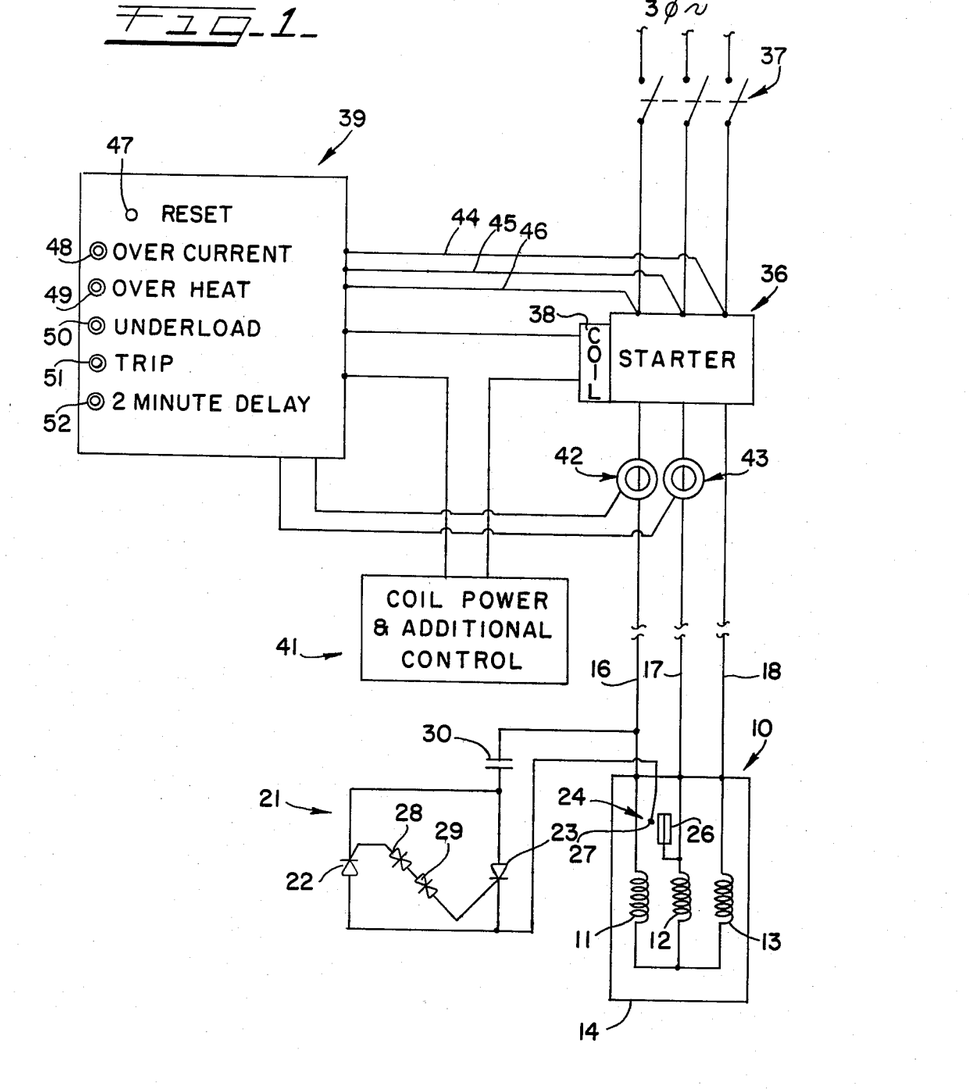
FIG. 1 is a schematic diagram of a system including apparatus incorporating the present invention.

The system shown in FIG. 1 includes an electric motor 10 including three windings 11, 12 and 13 which in the present example are connected in a wye configuration. In the present example, the motor is the type that is coupled to drive a water well pump that delivers the water to a storage tank. The windings 11–13 of the motor 10 are sealed in a stator casing 14, and the windings are connected by three power lines 16, 17 and 18 to the secondary winding of a conventional three-phase power supply transformer (not shown).

A pulse transmitter 21 is connected across the power lines 16 and 17 and is designed to respond to the motor temperature and to generate pulses on the lines 16 and 17 when the motor windings are excessively heated. The transmitter 21 includes two SCR's 22 and 23 which are connected in parallel and in back-to-back relation across the two power lines 16 and 17. A normally open heat responsive bimetal switch 24 is connected between the line 17 and the SCR's, and it includes a bimetal element 26 that is mounted closely adjacent the windings 11, 12, and 13. When the windings and the bimetal element 26 overheat, the element 26 flexes and engages a stationary contact 27, thereby connecting the SCR's across the power lines 16 and 17. Two diacs 28 and 29 are series connected between the gates of the SCR's, and a capacitor 30 is connected between the power line 16 and the SCR's.

The operation of the transmitter 21 is essentially as described in U.S. Pat. No. 3,594,584. When the lines 16, 17 and 18 are connected to a power supply and the switch 24 is closed, during one-half of each AC cycle, the transmitter 21 will generate one or more pulses. Consequently, the transmitter 21 will generate two or more pulses during each complete AC cycle. The pulses occur when the potential across the lines 16 and 17 exceeds the breakover potential of two diacs 28 and 29. When the breakover voltage is exceeded, one of the two SCR's is triggered into conduction, and on the next half cycle, the other SCR conducts. When an SCR conducts, the capacitor 30 charges or discharges briefly, thereby generating a high frequency pulse on the power lines 16 and 17.

The electric motor 10 is connected by the lines 16, 17 and 18 to the power supply through a magnetic starter 36 and a disconnect 37. The starter 36 includes switches which operate under the control of a coil 38, such that when disconnect 37 is closed, power is connected to the motor 10 when the coil 38 is energized. Connected in series with the coil 38 are circuitry in a control unit 39 and in control 41. The control unit 39 will be decribed in greater detail in connection with FIGS. 2 and 3. The control 41 includes a suitable power supply for the coil 38 and, for example, an on-off switch and a water level switch.

The control unit 39 is coupled to the lines 16 and 17 by two current transformers 42 and 43 to be described in greater detail hereinafter. Power for the unit 39 is provided by three conductors 44, 45 and 46 which connect the three power lines 16, 17 and 18 with the control unit 39. The control unit 39 has a front panel on which appear a reset button or switch 47, and five indicators or lights 48 through 52. Appropriate labels are provided adjacent the lights which, in the present example, include the designations OVERCURRENT, OVERHEAT, UNDERLOAD, TRIP and 2 MINUTE DELAY.

The control unit 39 (FIG. 2) inclues a processor 56 that controls the operation of the starter coil 38. The processor 56 includes a power supply 57, which may have a conventional construction, connected to the three lines 16, 17, and 18 by the conductors 44, 45 and 46, and it provides operating voltages at, in the present example, +5 volts and +8 volts. In addition, it is preferred that a standby battery 58 be provided to maintain operation of the processor 56 for a period of time if the disconnect 37 is opened.

Figure 2:
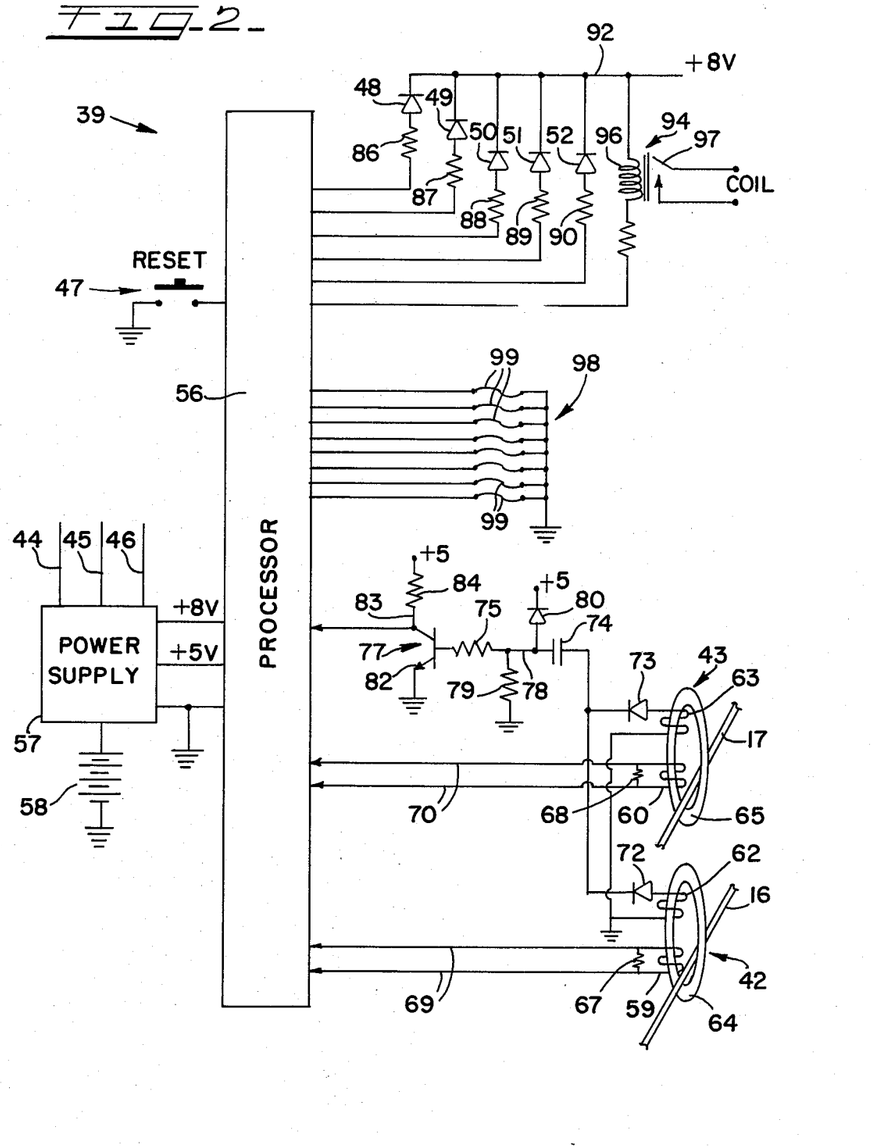
FIG. 2 is a schematic diagram of part of the system shown in FIG. 1.

The two current transformers 42 and 43 are identical and include low frequency windings 59 and 60 and high frequency or pulse windings 62 and 63. The windings 59 and 62 are both wound on a single ferrite core 64 and the two windings 60 and 63 are wound on another ferrite core 65. The two power lines 16 and 17 are threaded through the cores 64 and 65, and power current flowing through the lines 16 and 17 generates currents in the two windings 59 and 60. The two windings 59 and 60 are terminated by two resistors 67 and 68, and the potentials across the two resistors are representative of the power currents flowing through the lines 16 and 17. Conductors 69 and 70 connect the resistors 67 and 68 with inputs of the processor 56. The processor 56 includes an analog-to-digital converter section which converts the varying voltages on the conductors 69 and 70 to digital signals representative of the current magnitudes in the power lines 16 and 17.

Pulses appearing on the lines 16 and 17 that are generated by the transmitter 21 are picked up by the two high frequency windings 62 and 63. One side of each of the two windings 62 and 63 is connected to ground and the other sides of the two windings are connected through diodes 72 and 73, a capacitor 74 and a resistor 75 to the base of a transistor 77. Between the capacitor 74 and the resistor 75 is a junction 78 that is connected to ground through a resistor 79 and is connected to a +5 volt terminal through a diode 80. The components connected between the windings 62 and 63 and the transistor 77 form a pulse shaping network, and the height of the pulses passed by the network is limited to 5 volts by the diode 80.

The emitter 82 of the transistor 77 is connected to ground and the collector 83 is connected to +5 volts through a resistor 84. The collector is also connected to an input of the processor 56. In the absence of a pulse on one of the power lines 16 and 17, the potential on the base of the transistor 77 is low and the transistor is biased off, and the collector 83 is at +5 volts. When a pulse appears the base potential rises, thereby biasing the transistor on and the collector 83 drops to essentially ground potential value for the duration of the pulse. Thus, the transistor 77 both amplifies and inverts the pulses generated in the windings 62 and 63. The processor 56 normally is actuated by the negative going or falling edge of the collector 83 voltage.

Thus, the current transformers 42 and 43 and the circuits connecting them to the processor 39, form sensors that respond to the power current levels in the power lines 16 and 17 and to the pulses indicating an overheated motor condition.

The indicator lights 48 through 52 on the panel of the control unit 39 are formed, in the present example, by light emitting diodes (LED's) connected to the processor as shown in FIG. 2. Connected in series with the LED's are resistors 86 through 90, and the anodes of the diodes are connected to a +8 volt terminal 92. In certain circumstances, as will be described in connection with FIG. 3, one or more of the diodes is energized. Another output of the processor 56 comprises a relay 94 including the coil 96 and normally-open contacts 97, the relay coil 96 being connected between the processor and the +8 volt terminal 92. The contacts 97 are connected to the coil 38 that is shown in FIG. 1. When the motor 10 is operating normally, the contacts 97 are closed and the coil 38 is energized, but in the event of an abnormal operating condition the relay coil 96 is deenergized, the contacts 97 are open, and the coil 38 is deenergized in order to disconnect the motor 10 from the power supply.

In the event an abnormal operating condition occurs and the motor is turned off, the motor may be restarted automatically or by pressing the reset button 47 which appears on the panel of the unit 39 (FIG. 1) and which is connected to the processor 56 (FIG. 2).

Figure 3A:
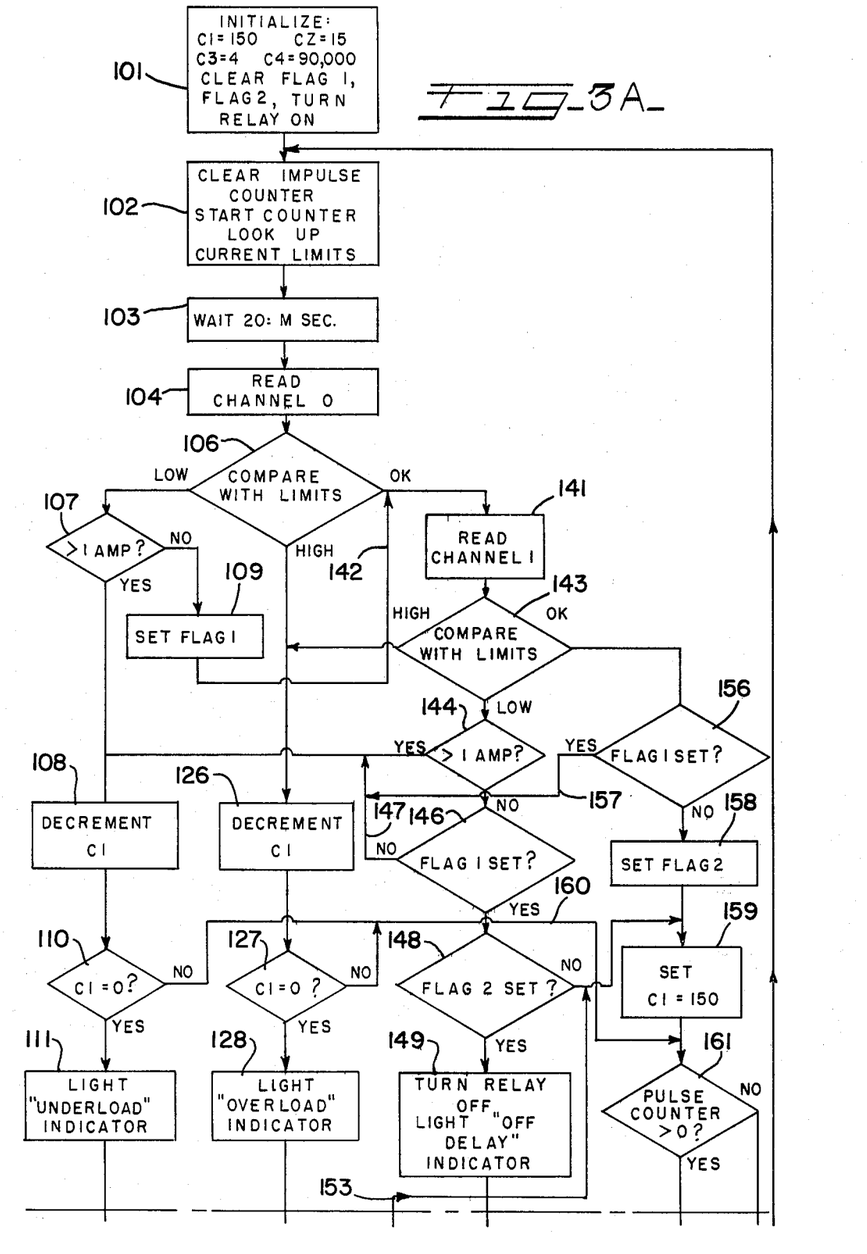
FIGS. 3A and 3B depict a flow chart showing the steps of a method in accordance with the invention.
Figure 3B:
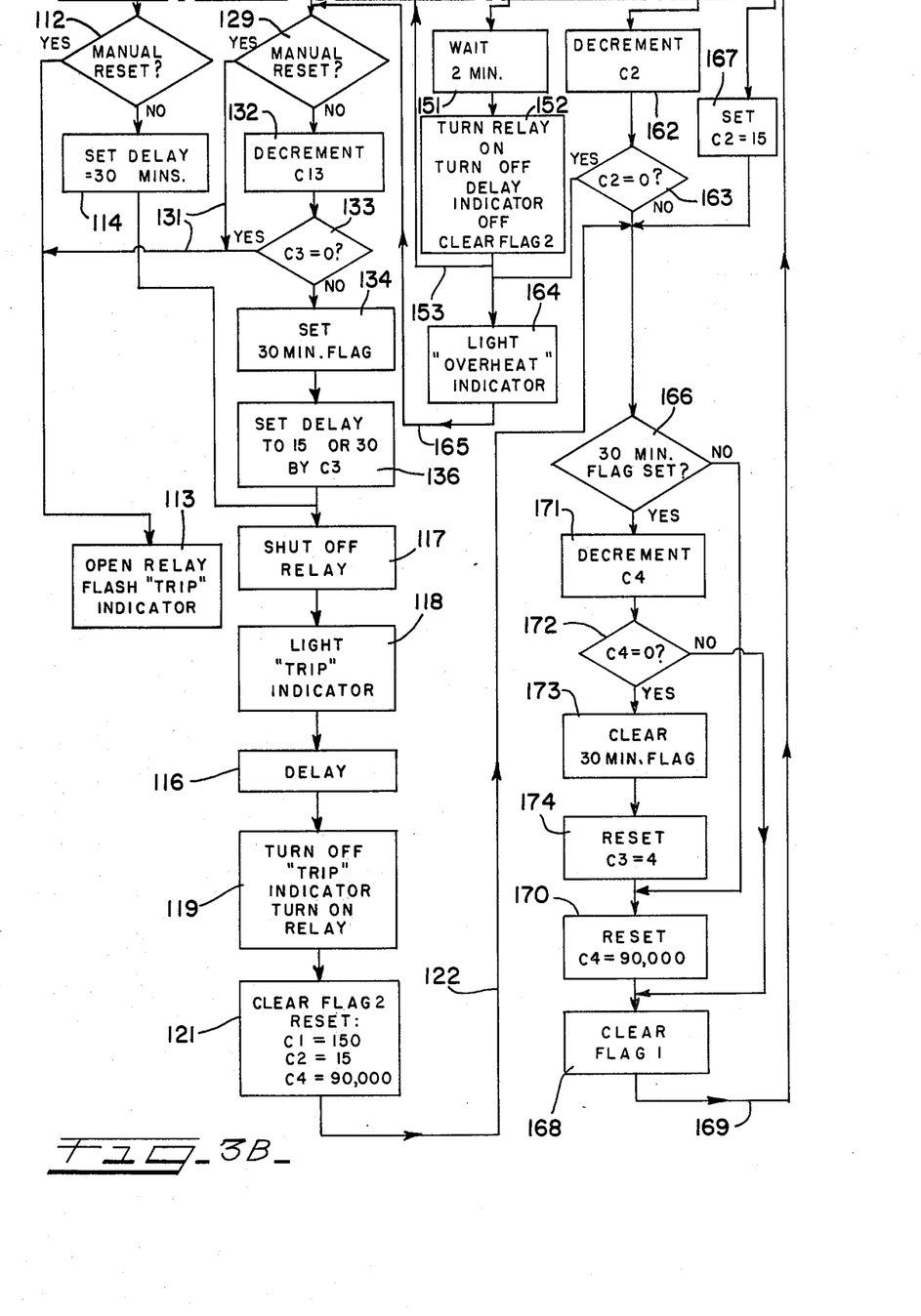

Also connected to the processor 56 is a plug-in header 98 that includes a plurality of jumpers 99. As will be described in connection with FIG. 3, the processor 56 is designed to monitor the power current in the power lines 16 and 17. Of course, different motor types or ratings have different current operating levels, and the header 98 makes it possible for the control unit to be used with a variety of motors having different ratings. The processor 56 includes a number of memories and the upper and lower limits of the safe operating ranges for a variety of different motor types are stored in the memories. By manually removing, as by cutting or clipping, one or more of the jumpers 99, the current limits for the type of motor at hand is drawn from the memories and utilized by the processor. One of the jumpers 99 may also be used to set the processor for either manual reset or automatic reset operation.

FIGS. 3A and 3B illustrate a flow chart of the steps in a method of controlling an electric motor in accordance with the invention. The method is preferably implemented utilizing the processor 56 programmed in accordance with the flow chart. As a specific example, the processor may be an Intel Model 8022. The processor utilizes four counters which, in the flow chart, are designated C-1, C-2, C-3 and C-4, a high frequency pulse counter. The processor also utilizes a plurality of "flags" and timers and a plurality of memories. The memories have the current limits entered in them as described. A header 98 having clipped jumpers is associated with each motor design and, prior to practicing the method utilizing the processor, a header 98 associated with the motor to be controlled is selected and connected to the processor.

The method is commenced at step 101 when the power is connected to the processor, and at this step a plurality of parameters of factors are placed in initial states or conditions. Counter C-1 is reset to 150, counter C-2 is reset to 15, counter C-3 is reset to 4 and counter C-4 is reset to 90,000. Two flags #1 and #2 are cleared and the coil 96 is energized. If the additional control switches in the unit 41 are closed, the starter coil 38 is energized and the motor is started. At the next step 102, the pulse counter is cleared and started and the current limits as selected by the header 98 are drawn from the memories. At the next step 103, there is a 20 millisecond delay while the pulse counter counts any pulses appearing on the lines 16 and 17. At a power frequency of 60 hertz, 20 milliseconds is slightly longer than one full AC cycle. The actual processing time for the entire routine is extremely short, and therefore the total cycling time of the processor is approximately 20 milliseconds due to the delay at the step 103.

In the present flow chart, the channel 0 is identified with one of the two power lines 16 and 17 and the channel 1 is identified with the other of the two power lines. At step 104, the current in channel 0 is read and in the next step 106 the current magnitude is compared with the current limits that have been drawn from the memory in step 102. If the measured current in channel 0 is below the permissable current range or window, the method proceeds to step 107 where the measured current level is compared with a one ampere current level. A measured current greater than one amp indicates that the power line is connected and the motor is running but the current level is abnormally low. On the other hand, if the measured current is less than one amp, it indicates that the motor is turned off or that the line is open and flag 1 is set at step 109. The flag is normally off and is triggered on only when the very low current condition exists in channel 0, and it stays on until cleared. Assuming for the time being that the measured current in channel 0 is greater than 1 amp but below the low current limit, the method proceeds to step 108 where the counter C-1 is decremented by 1. Counter C-1 is a three second counter because it will count down from 150 to 0 over a three second interval. Since the total routine time is 20 milliseconds, about 150 cycles of the processor will take place in three seconds. At the step 110 it is determined whether the counter C-1 has counted down to zero which would indicate that a low current fault has existed for three seconds. If the counter C-1 has counted down to zero, the method proceeds to step 111 where the underload indicator 50 on the panel is energized.

As previously mentioned, the system may be adjusted for manual operation. If it is, as determined at the step 112, then the method proceeds to step 113 where the relay 94 is deenergized and the trip indicator 51 (FIG. 1) is energized. The motor can then only be restarted by manually pressing the reset switch 47 which returns the method to step 101. If the system is set for automatic operation, the method proceeds to a set delay step 114 which sets a delay box 116 for a 30 minute time delay. After the step 114, the method proceeds to steps 117 and to 118 wherein the relay 94 (FIG. 2) is deenergized to turn off the motor and the trip indicator light 51 is energized. The step 118 also starts the time delay at the step 116. The motor is then turned off and the system is dormant for the one-half hour time delay. This delay is advantageous in a well pump application because an underload normally is the result of a low water level in the well. The half hour delay enables the well to refill with water before the motor is turned on again. At the end of the time delay, the method proceeds to step 119 where the trip indicator light 51 is turned off and the relay 94 is again energized in order to start the motor. At step 121, flag 2, to be described, is reset and the counters C-1, C-2 and C-4 are reset. The method then proceeds along the branch 122 as will be hereinafter described.

The foregoing sub-routine therefore checks for undercurrent in channel 0. Returning to step 106, if it is determined at this step that the current level in channel 0 is not low but, instead, is above the upper current limit, the method proceeds to step 126 where the three second counter C-1 is decremented by 1, and in each processor cycle when the current in channel 0 is above the limit, the counter is counted down by 1 toward 0. Steps 127 and 128 are similar to steps 110 and 111 except that the overcurrent indicator 48 is energized when the fault persists for three seconds. At step 129, it is again determined whether the processor is set for manual or automatic operation. If it is set for manual operation, the method proceeds along branches 131 to the step 113, and the system must be manually reset.

If the processor is adjusted for automatic reset operation, the method proceeds to step 132 where the counter C-3 is decremented by 1. The counter C-3 is preset to 4 as previously mentioned and it is employed to set the time delay as step 116. If there are four trips due to overload, each of which has a three second duration as measured by C1, then the counter C-3 will be counted down to zero, and this condition is determined at step 133. If the counter C-3 counted down to zero, the method then branches to step 113 and the system must be manually reset in order to start the motor once again. This operation is advantageous because it is likely that something is seriously wrong if an overcurrent condition exists for this period of time. Thus, even when the system is set for automatic reset operation, if an overcurrent condition exists for a certain time, the system will be turned off and must be restarted manually. If, at decision box 133, it is determined that the counter C-3 has not counted down to zero, the method proceeds to step 134 where a 30 minute flag is set. If there are no further overload trips within the following one-half hour interval, then counter C-3 is reset to 4, but if there is another trip within the half hour interval, then C-3 is not reset. Consequently, if there is one-half hour free of trips the the counter C-3 is reset, but four overload trips will require manual resetting. Step 136 sets the length of the time delay at step 116. If counter C-3 is at a count of 3 or 2 then the time delay is set at 15 minutes, but if the counter C-3 is at a count of 1 then the time delay is 30 minutes. After the step 136 where the time delay 16 is set, the method proceeds to steps 116 to 119 and 121 as previously described.

The foregoing part of the routine determines whether the current level in channel 0 is above or below the established limits. If the current is within the "window" or between the current limits, the method proceeds from step 106 to step 141 where the current in channel 1 is read. It should be noted that, going back to step 107, if the current in channel 0 is less than one amp and flag 1 has been set, the method also branches along line 142 to the input of step 141. After reading the current at step 141, the method proceeds to step 143 where the current value in channel 1 is compared with the high and low limits. If the current is higher than the upper limit, the method branches from step 143 to step 126 and proceeds as previously described. If the current is lower than the low limit, the method proceeds to step 144 where it is determined whether the current in channel 1 is greater than 1 amp. If the current is greater than 1 amp, the method branches to step 108 and proceeds as described. If the current is not greater than 1 amp, the method proceeds to step 146 where a determination is made of whether flag 1 has been previously set. If flag 1 has not been set, the method branches on line 147 to step 108 and proceeds as previously described. If flag 1 has been set, the method proceeds to step 148 where it is determined whether flag 2 has been set. Flag 2, as will be described, is set only when the currents in both channels are within the limits. If both flags have been set, the method proceeds to step 149 where the relay 94 is deenergized and the 2 minute delay indicator 52 is energized. It should be apparent that if the current in channel 1 is less than one amp, and flag 1 has been set as determined at step 146, this is an indication that no current is flowing in the lines 16 and 17 and the motor is not running.

If flag 2 is set as determined at step 148, then the motor was operating satisfactorily in the previous processor cycle but now the current in channel 1 is less than 1 amp. After the 2 minute delay at steps 149, 151 and 152, the indicator 52 is turned off and the motor is turned on again. Further, at step 152, the flag 2 is cleared. The method then proceeds on branch 153. Flag 2 is cleared at step 152 because the current in the present cycle is not normal. This routine including the 2 minute delay prevents the motor from repeatedly turning on and off as might happen if a motor were pumping water into a water logged storage tank. When the motor is in these circumstances, it is held off for a two minute period in order to prevent rapid motor recycling.

Returning to step 143, if it is determined at this step that the current level in channel 1 is within limits, the method proceeds to step 156 where it is determined whether flag 1 has been set. If flag 1 has been set, indicating that the current in channel 0 is below 1 amp but the current in channel 1 is within limits, the motor is running and the method proceeds on branch 157 to step 108 to take care of the low current in channel 0. If it is determined at step 156 that flag 1 has not been set, the method proceeds to step 158 where the flag 2 is set. This situation indicates that the currents in both power lines are within normal limits and the method then proceeds to step 159 where counter C-1 is reset to 150. At step 159, C-1 is reset if flag 2 has been set indicating that the currents in both channels are normal, or if the output of question box 148 is no, indicating that both power line currents are less than 1 amp and the motor turned off and was also off in the last cycle of the processor because flag 2 had not been previously set. If the motor has been turned on at step 152 after a 2 minute delay, C-1 is reset because it may have been partially counted down and then a fault cleared up before the end of the three second period.

The method then proceeds to step 161 where it is determined whether the pulse counter that detects high frequency pulses from the transmitter 21 has received any pulses. It will be apparent from the flow chart that the pulse counter is checked at step 161 when the currents in both channels are within the limits, proceeding from steps 158 and 159, or when the current in either channel is high or low but the fault has not existed for three seconds (branch 160 from box 110 or box 127).

If the motor is in an overheated condition, one or more pulses will have been transmitted on the power lines since the last cycle of the processor and therefore the pulse counter will have a count greater than zero. If at step 161 it is determined that the count in the pulse counter is greater than zero, the counter C-2 is decremented by one at step 162. If the overheated condition of the motor exists for 15 consecutive cycles of the processor, the counter C-2 is counted down to zero and at step 163 it is determined whether counter C-2 is at zero. If C-2 has counted down to zero the method proceeds to step 164 where the overheat indicator 49 is energized and then on branch 165 to step 129.

Returning to step 161, if the pulse counter is at zero, the step 167 resets the counter C-2 to 15. Consquently, if in a processor cycle where the pulse counter is checked and no pulses have been received since the previous cycle, the counter C-2 is reset to 15. Pulses must therefore be received for 15 consecutive processor cycles before the processor will indicate an overheated condition. This arrangement prevents the processor from responding to spurious signals.

At step 134, a 30-minute flag is set in the event of a trip due to an overcurrent condition. The 30-minute flag is also set in the event the motor overheats and C-2 counts down to 0, the method in this instance proceeding from steps 163 and 164 to branch 165 and to box 129. At decision box 166, a determination is made of whether the 30-minute flag has been set, and this determination is made in three instances: from step 163 when C-2 does not equal zero, from step 167 when the pulse counter registers zero and C-2 is reset, and from step 121 after the motor has been restarted following a trip. The 30-minute flag is set only when there has recently been a trip condition caused by an overcurrent condition or an overheated motor condition. If the 30-minute flag has not been set, indicating that the motor has been operating normally for the past 30 minutes, the method proceeds to step 170 where counter C-4 is reset to 90,000, then to step 168 where flag 1 is cleared, and then to a loop back on branch 169 to step 102 to start a new cycle. If the 30-minute flag has been previously set, the method proceeds from step 166 to step 171 where counter C-4 is decremented by 1. At the next step 172, it is determined whether C-4 is 0, and if it is not, the method branches to step 168. If it is equal to 0, the method proceeds to step 173 where the 30-minute flag is cleared because there has not been a trip for 30-minutes. After this flag is cleared, the counter C-3 is reset to 4 at step 174, and the counter C-4 is reset to 90,000 at step 170.

As previously mentioned, each cycle of the processor requires 20 milliseconds. If the counter C-4 is not reset, it will decrement from 90,000 to 0 over a 30 minute time interval. The counter C-4 is decremented only when the 30-minute flag is set and this occurs only after a trip due to an overcurrent or an overheat. A count of 0 in C-4 indicates that it has been 30-minutes since the last trip, and then the flag is cleared and counters C-3 and C-4 are reset.

It will be apparent from the foregoing that the control unit continuously monitors the motor current and temperature during operation. The control checks two power lines for low current to protect the motor in a low water condition. Assuming the unit is set for automatic operation, if the undercurrent exists for a certain length of time, the motor is turned off for 30 minutes by the boxes 114 and 116. If an overload condition exists for a certain length of time, the motor is again turned off for increasing lengths of time. After four overload trips, the motor is turned off and can only be manually restarted. An overheated motor condition is handled similarly to an overload condition. Since an overloaded or overheated motor condition is more serious than an undercurrent condition, the off time is increased with the number of faults and eventually the motor can only be restarted manually. Thus, the unit responds to the severity and type of fault. Further, the unit adjusts or responds to the frequency of the faults, and it is able to determine whether power is connected to the motor.

The transmitter generates a precise and known number of pulses on the power lines when the motor overheats, making possible the proper functioning of the processor. The pickup transformers are readily coupled to the supply lines and serve both as power current and pulse sensors. The header makes it possible to use the system with a variety of different motor sizes simply by either selecting an appropriately clipped header from a group of different headers, or by clipping a header to suit a particular motor.

The control further includes a number of other advantageous features, such as indicators that show past and present trip history and means to prevent rapid on-off cycling of the motor. After a fault has occurred due to overheat, undercurrent or overcurrent, the indicators will remain energized even though the motor has restarted and is running normally. Thus, the control provides a record of past faults. The battery 58 keeps the indicators energized for a short time when the disconnect 37 is opened to permit inspection of the system. The indicators remain on until the reset switch is manually closed, which starts the control at step 101. When the motor has been running normally and is then turned off as by the unit 41, the 2-minute delay at the step 151 prevents the motor from being turned on again in a short time, unless of course the reset switch is closed.

When the control is used in a three-phase system as described, the sensor transformers 42 and 43 may be connected to any two of the three lines, not just to the two lines that are connected to the pulse transmitter 21. While the control is especially useful with a relatively large 3-phase load, it may also be used with a single phase load, in which case only one sensor transformer coupled to one power line may be necessary.

I claim:

1. A method of controlling and protecting an electric load that is adapted to be connected to a power supply by two or more power lines, said method comprising the steps of:
   (a) coupling to at least one of the lines to sense the level of power current flowing through the line;
   (b) comparing the power current level with an upper limit and a lower limit;
   (c) comparing the length of time it is outside the limits with a preselected time interval when the current level is outside of said limits and determining that a fault condition exists when the level is outside said limits longer than said time interval;
   (d) disconnecting the power from the load when a fault condition exists;
   (e) starting a reset time interval;
   (f) reconnecting the power to the load at the end of said reset time interval;
   (g) counting the number of faults that occur due to the current level being above the upper limit; and
   (h) varying the length of said reset time interval dependent on said number of said faults.

2. The method of claim 1, and further including the steps of:
   (a) indicating that a fault condition exists after the power is reconnected to the load at the end of the reset time interval.

3. The method of claim 1, wherein a pulse transmitter is coupled to the power lines and generates pulses on the power lines in response to a condition of the load, and further including the steps of:
   (a) coupling to at least one of said power lines to sense said pulses;
   (b) determining whether a predetermined number of pulses occur in regular succession; and
   (c) disconnecting the power from the load when said predetermined number appear in regular succession.

4. The method of claim 1, and further including the step of:
   (a) starting said count of faults at zero when a fault has not occurred for a predetermined length of time.

5. A method of controlling and protecting an electric load that is adapted to be connected to a power supply by two or more power lines, said method comprising the steps of:
   (a) coupling to at least one of the lines to sense the level of power current flowing through the line;
   (b) comparing the power current level with an upper limit and a lower limit;
   (c) comparing the length of time it is outside the limits with a preselected time interval when the current level is outside of said limits and determining that a fault condition exists when the level is outside said limits longer than said time interval;
   (d) disconnecting the power from the load when a fault condition exists;
   (e) starting a reset time interval;
   (f) reconnecting the power to the load at the end of said reset time interval;
   (g) comparing the power current level with a low current value when the current level is below said lower limit;
   (h) repeating the foregoing step (2) to form a series of cycles;
   (i) determining whether the power current level was within said limits during a previous cycle; and
   (j) disconnecting the power from the load for an off delay interval when the current level was within said limits during a previous cycle but is presently below said lower limit.

6. A method of controlling and protecting an electric load that is adapted to be connected to a power supply by two or more power lines, the load having a pulse transmitter mounted adjacent it and the transmitter being coupled to at least one power line, the method comprising the steps of:
   (a) coupling to a power line to sense any pulses appearing on said line;
   (b) repeatedly sensing at regular intervals whether pulses appeared on the line during an interval;
   (c) counting successive intervals during which pulses appear on the power line;
   (d) comparing said count with a selected number;
   (e) disconnecting the power from the load when the count equals said number;
   (f) starting a reset time interval;
   (g) reconnecting the power to the load at the end of said reset time interval;
   (h) counting the number of times the load is disconnected; and
   (i) vary the length of said reset time interval dependent on the said number of times.

7. The method of claim 6, and further including the steps of:
   (a) coupling to a power line to sense the power current to the load;
   (b) comparing the power current with overload and underload current limits; and
   (c) disconnecting the power from load when the power current is outside said limits.

8. Apparatus for controlling and protecting an electric load that is adapted to be connected to a power supply by two or more power lines, said apparatus comprising:
   (a) means for coupling to at least one of the lines to sense the level of power current flowing through the line and comparing the power current level with an upper limit and a lower limit;

(b) means for comparing the length of time it is outside the limits with a preselected time interval when the current level is outside of said limits and for determining that a fault condition exists when the level is outside said limits longer than said time interval;

(c) means for disconnecting the power from the load when a fault condition exists (d) means for starting a reset time interval;

(e) means for reconnecting the power to the load at the end of said reset time interval;

(f) means for counting the number of faults that occur due to the current level being above the upper limit; and (g) means for varying the length of said reset time interval dependent on said number of said faults.

9. Apparatus as in claim 9, and further including:

(a) means for indicating that a fault condition exists after the power is reconnected to the load at the end of the reset time interval.

10. Apparatus as in claim 8, wherein a pulse transmitter is coupled to the power lines and generates pulses on the power lines in response to a condition of the load, and further including:

(a) means for coupling to at least one of said power lines to sense said pulses;

(b) means for determining whether a predetermined number of pulses occur in regular succession; and (c) means for disconnecting the power from the load when said predetermined number appear in regular succession.

11. Apparatus as in claim 8, and further including:

(a) means for starting said count of faults at zero when a fault has not occurred for a predetermined length of time.

12. Apparatus for controlling and protecting an electric load that is adapted to be connected to a power supply by two or more power lines, said apparatus comprising:

(a) means for coupling to at least one of the lines to sense the level of power current flowing through the line;

(b) means for comparing the length of time it is outside the limits with a preselected time interval when the current level is outside of said limits and for determining that a fault condition exists when the level is outside said limits longer than said time interval;

(c) disconnecting the power from the load when a fault condition exists;

(d) means for starting a reset time interval;

(e) means for reconnecting the power to the load at the end of said reset time interval.

(f) means for comparing the power current level with a low current value when the current level is below said lower limit;

(g) means for determining whether the power current level was earlier within said limits; and (h) means for disconnecting the power from the load for an off delay interval when the current level was earlier within said limits but it below said lower limit.

13. Apparatus for controlling and protecting an electric motor that is adapted to be connected to a power supply by at least two power lines, comprising:

(a) current sensor means adapted to be connected to at least one line for sensing power current therethrough;

(b) processing means for comparing said power current with underload and overload current limits, determining whether said power current is outside said limits for a time interval and in such event indicating a fault condition and forming a reset time interval;

(c) means connected to said processing means for disconnecting power from said motor during said reset time interval, (d) header means connected to said processing means for setting said current limits in said processing means;

(e) pulse sensor means coupled to said power lines for sensing pulses thereon, and said processing means including means responsive to a regular succession of pulses for disconnecting power from said motor;

(f) said pulse sensor means and said current sensor means comprising a current transformer including a core and separate sensor windings.

14. Apparatus as in claim 13, and further including indicator means for indicating a fault condition, and said processing means including means for energizing said indicator means after said reset time interval.

15. Apparatus as in claim 13, and further including a tramsmitter adjacent said motor and coupled to the power lines, said transmitter being heat responsive and generating pulses on said lines when the motor is heated to above a predetermined level.

* * * * *